(12) United States Patent
Okazaki et al.

(10) Patent No.: US 8,054,433 B2
(45) Date of Patent: Nov. 8, 2011

(54) VIEWING ANGLE CONTROL DEVICE AND DISPLAY PROVIDED WITH THE SAME

(75) Inventors: Tsuyoshi Okazaki, Osaka (JP); Takehiko Sakai, Osaka (JP); Katsuhiko Morishita, Osaka (JP); Yoshiharu Kataoka, Osaka (JP); Chikanori Tsukamura, Osaka (JP); Dai Chiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 272 days.

(21) Appl. No.: 12/529,649

(22) PCT Filed: Mar. 13, 2008

(86) PCT No.: PCT/JP2008/054592
§ 371 (c)(1),
(2), (4) Date: Sep. 2, 2009

(87) PCT Pub. No.: WO2008/114677
PCT Pub. Date: Sep. 25, 2008

(65) Prior Publication Data
US 2010/0026937 A1    Feb. 4, 2010

(30) Foreign Application Priority Data
Mar. 16, 2007    (JP) .................................. 2007-069128

(51) Int. Cl.
*G02F 1/1333*    (2006.01)
*G02F 1/1347*    (2006.01)
(52) U.S. Cl. .......................................... 349/138; 349/74
(58) Field of Classification Search .................... 349/16, 349/74–83, 138
See application file for complete search history.

(56) References Cited

U.S. PATENT DOCUMENTS

| | | | |
|---|---|---|---|
| 2005/0190329 A1 | 9/2005 | Okumura | |
| 2005/0213055 A1 | 9/2005 | Yokote et al. | |
| 2006/0066785 A1 | 3/2006 | Moriya | |
| 2006/0285040 A1* | 12/2006 | Kobayashi | 349/117 |
| 2007/0030240 A1 | 2/2007 | Sumiyoshi et al. | |

FOREIGN PATENT DOCUMENTS

JP    7-333640    12/1995
(Continued)

OTHER PUBLICATIONS

International Search Report for PCT/JP2008/054592, mailed Jun. 10, 2008.

*Primary Examiner* — Mark Robinson
*Assistant Examiner* — Michael Inadomi
(74) *Attorney, Agent, or Firm* — Nixon & Vanderhye, P.C.

(57) ABSTRACT

There are provided a viewing angle control device that can provide a black display without coloring and achieve a significantly improved shielding ability during a narrow viewing angle state, and a display using the same. In order to adjust VT (voltage-transmittance) characteristics of a viewing angle control liquid crystal panel (2) that switches a viewing angle between a wide viewing angle state and a narrow viewing angle state by using birefringence of liquid crystal, the viewing angle control liquid crystal panel (2) includes a translucent dielectric film (206g, 206r) for adjusting the voltage-transmittance characteristics of the liquid crystal at a position corresponding to a picture element of at least one color in a display liquid crystal panel (1) on at least one of a pair of translucent substrates (201, 202) that sandwich the liquid crystal therebetween.

12 Claims, 8 Drawing Sheets

FOREIGN PATENT DOCUMENTS

| | | |
|---|---|---|
| JP | 10-197844 | 7/1998 |
| JP | 10-268281 | 10/1998 |
| JP | 11-30783 | 2/1999 |
| JP | 3481741 | 10/2003 |
| JP | 2005-265930 | 9/2005 |
| JP | 2006-113479 | 4/2006 |
| WO | 2007/094358 | 8/2007 |
| WO | 2007/094386 | 8/2007 |
| WO | 2007/094390 | 8/2007 |
| WO | 2008/047754 | 4/2008 |
| WO | 2008/114678 | 9/2008 |

\* cited by examiner

| | | Comparative example | Example |
|---|---|---|---|
| Driving voltage[V] | | 3.7 | 4.0 |
| Transmittance [%] | Blue (450nm) | 10.4 | 5.0 |
| | Green (550nm) | 0.8 | 0.8 |
| | Red (650nm) | 11.9 | 9.0 |

VIEWING ANGLE CONTROL DEVICE AND DISPLAY PROVIDED WITH THE SAME

This application is the U.S. national phase of International Application No. PCT/JP2008/054592, filed 13 Mar. 2008, which designated the U.S. and claims priority to Japanese Patent Application No. 2007-069128, filed 16 Mar. 2007, the entire contents of each of which are hereby incorporated by reference.

TECHNICAL FIELD

The present invention relates to a viewing angle control device that can switch a viewing angle between a wide viewing angle and a narrow viewing angle by using birefringence of liquid crystal, and a display provided with the same.

BACKGROUND

Nowadays, a liquid crystal display has been used commonly in personal computers, PDAs (persona digital assistants), mobile phones, and the like. As such devices become widespread, the chances of displaying information on a liquid crystal display screen in public are increasing.

The following is a brief description of a configuration of a conventional liquid crystal display. The liquid crystal display has a liquid crystal layer sandwiched between a pair of translucent substrates. On one of the translucent substrates i.e., an active matrix substrate), data signal lines to which display data is applied and gate signal lines for driving active elements described below are arranged in matrix. At each intersection of the data signal lines and the gate signal lines, the active element such as a thin film transistor (TFT) to which a picture element electrode is connected is connected. The picture element electrodes are arranged on the translucent substrate in matrix. On the other translucent substrate (i.e., a counter substrate), a color filter layer including color filters of red, green, and blue, and a black matrix for preventing light leakage between these color filters is formed. On the color filter layer, a transparent conductive film functioning as a counter electrode for driving liquid crystal is laminated.

Further, on each of the active matrix substrate and the counter substrate, a Liquid crystal alignment film made of polyimide or the like is formed under a predetermined condition, followed by an alignment treatment such as rubbing in accordance with a desired viewing angle. Then, a spacer such as plastic beads for forming a cell gap is arranged on one of the substrates, and an adhesive such as a thermosetting sealant is applied to the periphery of a display area on the other substrate. Thereafter, the active matrix substrate and the counter substrate are adhered to each other with the adhesive, and a liquid crystal material is injected between the substrates by a vacuum injection method or the like, followed by sealing of an injection port. In this manner a liquid crystal display element is obtained.

Meanwhile, a liquid crystal display is required to have display quality such as high brightness, high contrast, high definition, and a wide viewing angle, which is being improved rapidly. In particular, conventional modes such as a TN (twisted nematic) mode and a STS (super twisted nematic) mode are disadvantageous in that they lead to a narrow viewing angle. In order to overcome this disadvantage, liquid crystal modes capable of providing a wide viewing angle, such as MVA (multi-domain vertical alignment), CPA (continuous pinwheel alignment), IPS (in-plane switching), FFS (fringe field switching), OCB (optically compen stated birefringence), are being developed. However, the development of such liquid crystal modes capable of providing a wide viewing angle has led to another problem.

That is, when a user observes a screen of a mobile personal computer, a PDA, a mobile phone, or the like having a wide viewing angle in public, the wide viewing angle of the screen allows others to view the screen from a viewing angle in a direction other than a front direction for the user, such as a horizontal direction, which may result in leakage of private information. Nowadays, combined with enforcement of the Personal Information Protection Law, there has been an increasing demand from users for privacy protection by making a viewing angle narrower contrary to a conventional tendency. To this end, it has been popular to attach a viewing angle adjusting film for making a viewing angle narrower to a screen, which, however, always makes the viewing angle narrower. Thus, it also has been demanded to switch dynamically between a wide viewing angle inherent in a display and a narrow viewing angle in favor of privacy protection according to need. In view of this, a display in which a viewing angle control device capable of switching dynamically between a wide viewing angle and a narrow viewing angle by using birefringence of liquid crystal is provided on a display device for displaying an image has been proposed.

Various systems of viewing angle control devices using liquid crystal have been proposed, such as a light dispersion system using polymer-dispersed liquid crystal (Japanese Patent No. 3481741 and JP 7(1995)-333640 A), a light absorption system using guest host liquid crystal (JP 10(1998)-197844 A), a TN mode (JP 10(1998)-268251 A), an IPS mode (JP 11(1999)-30783 A), a hybrid alignment mode (JP 2005-275342 A), and a homogeneous alignment mode (JP 2005-316407 A).

In particular, the viewing angle control device using homogeneously aligned liquid crystal as disclosed in JP 2005-316407 A has many advantages such as a simple manufacturing process, capability of switching between a wide viewing angle and a narrow viewing angle, and relatively high transmittance in a normal direction. With reference to FIGS. 11A and 11B, a configuration of the viewing angle control device using homogeneously aligned liquid crystal will be described. FIG. 11A is a schematic view showing a state of liquid crystal molecules during a wide viewing angle mode of the viewing angle control device, and FIG. 11B is a schematic view showing a state of the liquid crystal molecules during a narrow viewing angle mode of the viewing angle control device. In FIGS. 11A and 11B, reference numerals 91 and 92 denote a pair of translucent substrates, and reference numeral 93 denotes liquid crystal molecules in a liquid crystal layer sandwiched between the translucent substrates 91 and 92. Arrows denoted by reference numerals 94 and 95 represent polarization-transmission axes of polarizers laminated on the translucent substrates 91 and 92. The polarization-transmission axes 94 and 95 are parallel to each other. Alignment films on the translucent substrates 91 and 92 are subjected to a so-called anti-parallel rubbing treatment in directions substantially parallel to the polarization-transmission axes 94 and 95 and opposite to each other between the translucent substrates 91 and 92.

In this viewing angle control device, in a state where no voltage is applied to the liquid crystal layer, the liquid crystal molecules 93 are arranged such that their long molecular axes are substantially horizontal to the polarization-transmission axes 94 and 95 as shown in FIG. 11A. Thus, even if a view point is inclined horizontally with respect to a panel from a normal direction of the substrates (i.e., in a plane perpendicular to the polarization-transmission axes 94 and 95), no phase difference occurs in the liquid crystal layer, thereby maintaining a wide viewing angle of a display device on which the viewing angle control device is laminated. This state is referred to as a wide viewing angle state.

On the other hand, when a predetermined voltage is applied to the liquid crystal layer; the liquid crystal molecules 93 rise at an inclination angle θ with respect to a substrate surface in accordance with the applied voltage as shown in FIG. 11B. Consequently, if a view point is inclined horizontally with respect to the panel from the normal direction of the substrates, a phase difference occurs in the liquid crystal layer. When the inclination of the view point reaches a certain angle, a black display is caused according to VT (voltage-transmittance) characteristics as shown in FIG. 12. In this manner, a display on the display device is shielded by the black display of the viewing angle control device in a horizontal direction other than the normal direction (front side) of the substrates. This state is referred to as a narrow viewing angle state.

DISCLOSURE OF INVENTION

Problem to be Solved by the Invention

In the viewing angle control device using birefringence of the liquid crystal as described above, coloring occurs during the black display due to wavelength dispersion of the birefringence of the liquid crystal. More specifically, the refractive index of the liquid crystal varies depending on the wavelength of incident light. Thus, in the case of white incident light, when the white light is separated into respective components of blue (in the vicinity of a wavelength of 450 nm), green an the vicinity of a wavelength of 550 nm), and red (in the vicinity of a wavelength of 650 nm), the refractive index of the liquid crystal varies depending on the color. Accordingly the bottom (a voltage value that causes the black display) in the VT characteristics varies among the respective components of red, blue, and green as shown in FIG. 13. Thus, the transmittance of the respective components of red, blue, and green varies with respect to an applied voltage, which results in the occurrence of coloring.

The present invention was made in view of the foregoing problem, and it is an object of the present invention to provide a viewing angle control device that includes a means for adjusting VT characteristics of the viewing angle control device, so as to cause a black display without coloring during a narrow viewing angle state, and a display provided with the same.

Means for Solving Problem

In order to achieve the above-described object, a display according to the present invention includes: a display device including picture elements of a plurality of colors, each being driven in accordance with an image to be displayed; and a viewing angle control device that is arranged on at least one of a backside and a front side of the display device and controls a viewing angle of the display device. The viewing angle control device includes; a pair of substrates, each including at least an electrode and an alignment film; liquid crystal sandwiched between the pair of substrates; a driving circuit that applies a voltage to the electrode provided on each of the pair of substrates; and a pair of polarizers provided so as to sandwich the pair of substrates therebetween. The driving circuit switches the voltage to be applied to the electrode, thereby switching a range of the viewing angle in which a display on the display device can be viewed, between a first state providing a first viewing angle range and a second state providing a second viewing angle range that is within the first viewing angle range and narrower than the first viewing angle range. The viewing angle control device includes a dielectric film at a position corresponding to the picture element of at least one of the colors in the display device on at least one of the pair of substrates, the dielectric film adjusting voltage-transmittance characteristics of the liquid crystal of the viewing angle control device.

In the above-described display it is preferable that the picture elements of the plurality of colors include picture elements of three colors that blend to make white, and the viewing angle control device includes the dielectric films at positions corresponding to the picture elements of two of the three colors in the display device on at least one of the pair of substrates, the dielectric films having thicknesses that vary depending on the color.

In the above-described display it is preferable that the picture elements of the three colors are picture elements of red, green, and blue, and the dielectric films are provided at positions corresponding to the red and green picture elements in the display device on at least one of the pair of the substrates.

Further, in the above-described display the dielectric film may have a film thickness d that can be obtained by the following formula. In the formula, VST is the highest voltage value among applied voltages that respectively lead to minimum transmittance for wavelength components of the three colors when the dielectric film is not provided, Vmin is an applied voltage that leads to minimum transmittance for a wavelength component of the color of the picture element to which the dielectric film corresponds, $\in$s is a dielectric constant of the dielectric film, $\in$LC is a dielectric constant of the liquid crystal when the voltage VST is applied, and dLC is a thickness of the liquid crystal layer.

$$d = \in s \times dLC(VST - V\min)/(V\min \times \in LC)$$

In the above-described display, it is preferable that the liquid crystal layer of the viewing angle control device includes positive-type nematic liquid crystal, the polarizers are arranged so that their polarization-transmission axes are substantially parallel to rubbing directions of the alignment films, and the driving circuit provides the first viewing angle range by applying no voltage to the liquid crystal layer, and provides the second viewing angle range by applying a predetermined voltage to the liquid crystal layer.

Further, in the above-described display, it is preferable that the alignment films provided respectively on the pair of substrates of the viewing angle control device are subjected to a rubbing treatment in directions parallel and opposite to each other.

Further, in order to achieve the above-described object, a viewing angle control device according to the present invention is arranged on at least one of a backside and a front side of a display device, and controls a viewing angle of the display device, the display device including picture elements of a plurality of colors, each being driven in accordance with an image to be displayed. The viewing angle control device includes: a pair of substrates, each including at least an electrode and an alignment film; liquid crystal sandwiched between the pair of substrates; a driving circuit that applies a voltage to the electrode provided on each of the pair of substrates; and a pair of polarizers provided so as to sandwich the pair of substrates therebetween. The driving circuit switches the voltage to be applied to the electrode, thereby switching a range of the viewing angle in which a display on the display device can be viewed, between a first state providing a first viewing angle range and a second state providing a second viewing angle range that is within the first viewing angle range and narrower than the first viewing angle range. The viewing angle control device includes a dielectric film at a position corresponding to the picture element of at least one of the colors in the display device on at least one of the pair of substrates, the dielectric film adjusting voltage-transmittance characteristics of the liquid crystal.

Effects of the Invention

According to the present invention, in order to adjust VT characteristics of the viewing angle control device, the viewing angle control device includes a dielectric film for adjusting the voltage-transmittance characteristics of liquid crystal at a position corresponding to a picture element of at least one color in the display device on at least one of a pair of substrates that sandwich the liquid crystal therebetween. Therefore, it is possible to provide a viewing angle control device that can provide a black display without coloring and achieve a significantly improved shielding ability during a narrow viewing angle state, and a display using the same.

DESCRIPTION OF THE INVENTION

Hereinafter, a specific embodiment of the present invention will be described with reference to the drawings. Each figure, which will be referred to in the following, shows only main members required for describing the present invention among constituent members of the embodiment of the present invention, in a simplified manner for convenience of explanation. Thus, a display according to the present invention can include any constituent members not shown in each figure. Further, the size and size ratio of the members in each figure do not exactly reflect those of actual constituent members.

Figure 1:
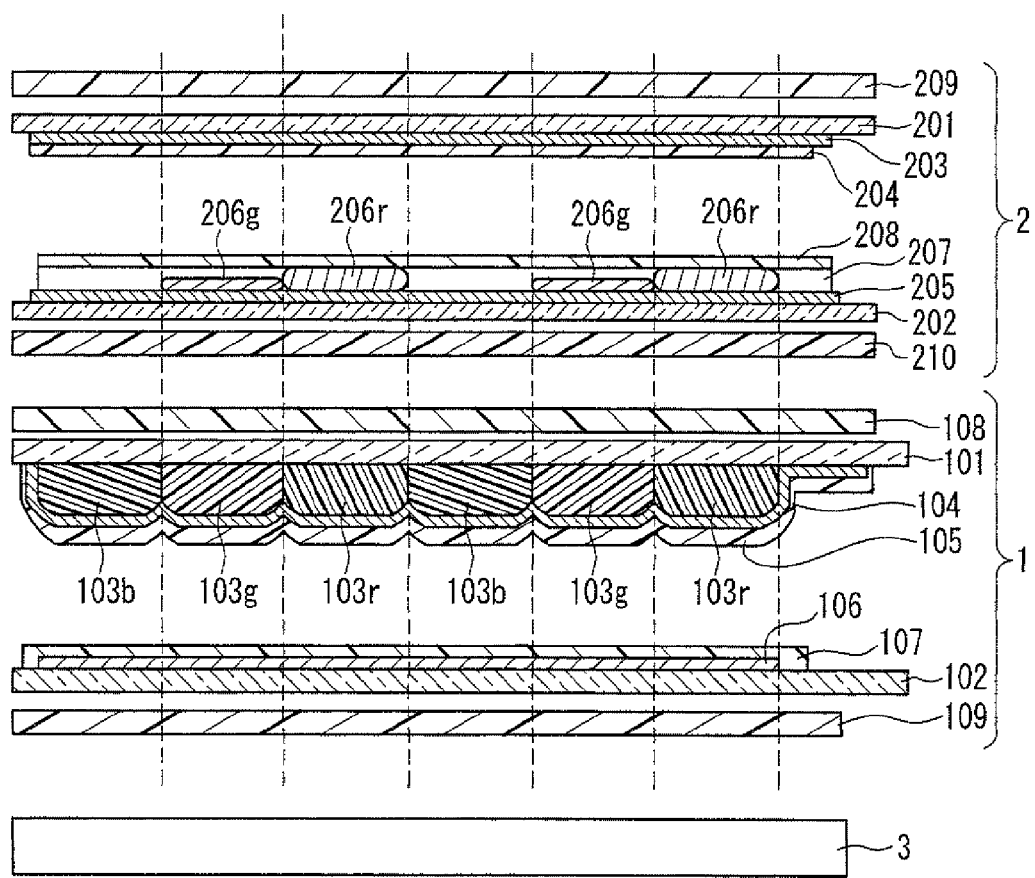
FIG. 1 is a cross-sectional view showing a schematic configuration of a display according to an embodiment of the present invention.

FIG. 1 is a cross-sectional view showing a schematic configuration of a liquid crystal display according to an embodiment of the present invention. As shown in FIG. 1, the liquid crystal display according to the present embodiment includes two liquid crystal panels, i.e., a display liquid crystal panel 1 (display device) for displaying an image and a viewing angle control liquid crystal panel 2 (viewing angle control device). The viewing angle control liquid crystal panel 2 of the present embodiment is arranged on an observer side relative to the display liquid crystal panel 1. In the embodiment shown in FIG. 1, the display liquid crystal panel 1 is a transmission liquid crystal display device, and a backlight 3 is arranged on a backside of the display liquid crystal panel 1. However, in the liquid crystal display to which the present invention is applied, the display liquid crystal panel 1 is not limited to the transmission liquid crystal display device, and may be a semi-transmission liquid crystal panel or a reflection liquid crystal panel. When the display liquid crystal panel 1 is a reflection liquid crystal panel, the backlight 3 is not necessary. In the embodiment shown in FIG. 1, the viewing angle control liquid crystal panel 2 is arranged on a front side of the display liquid crystal panel 1. However, the viewing angle control liquid crystal panel 2 may be provided on a backside of the display liquid crystal panel 1. Alternatively, one or more viewing angle control liquid crystal panels 2 may be provided on each of the backside and the front side of the display liquid crystal panel 1.

The display liquid crystal panel 1 is an active matrix type liquid crystal display device, for example, and includes a liquid crystal material (not shown) sandwiched between a pair of translucent substrates 101 and 102. In FIG. 1, the translucent substrate 101 is a color filter substrate (counter substrate), and the translucent substrate 102 is an active matrix substrate.

More specifically, on the translucent substrate 101, color filters 103, a translucent electrode film 104 functioning as a counter electrode, and an alignment film 105 are laminated. On the other hand, on the translucent substrate 102, active elements such as TFTs and signal lines and scanning lines for driving the active elements (which are not shown) are formed in a known manner. Further, a pixel electrode 106 patterned for each picture element and an alignment film 107 are provided. Although the display liquid crystal panel 1 includes a driving circuit for supplying a driving signal to the signal lines and the scanning lines, it is not shown in FIG. 1.

The color filters 103 including red color filters 103r, green color filters 103g, and blue color filters 103b on the color filer substrate are arranged in a stripe shape in accordance with the arrangement of the picture elements on the active matrix substrate. Linear polarizers 108 and 109 are arranged on outer sides of the translucent substrates 101 and 102, respectively.

The alignment films 105 and 107 are made of polyimide, for example. The alignment films 105 and 107 are subjected to a so-called anti-parallel rubbing treatment in directions parallel to the stripe of the color filters 103 and parallel and opposite to each other between the alignment films 105 and 107. The linear polarizers 108 and 109 are arranged so that their polarization axes are parallel to the rubbing directions of the alignment films 105 and 107. In the present embodiment, the display mode of the display liquid crystal panel 1 is a twisted nematic mode. However, the display mode of the display liquid crystal panel 1 is arbitrary.

The viewing angle control liquid crystal panel 2 includes positive-type nematic liquid crystal (not shown) sandwiched between a pair of translucent substrates 201 and 202. On the translucent substrate 201, a translucent electrode film 203 having a thickness of about 100 nm is formed by sputtering throughout a region corresponding to an active area (area in which effective picture elements are present) in the display liquid crystal panel 1. On the translucent electrode film 203, an alignment film 204 is laminated. On the translucent substrate 202, a translucent electrode film 205 having a thinness of about 100 nm is formed by sputtering throughout a region corresponding to the active area in the display liquid crystal panel 1. The translucent electrode film 205 may be patterned into an arbitrary shape such as a character, a geometrical pattern, and a design. The translucent electrode films 203 and 205 preferably are made of ITO (indium tin oxide), for example. However, the material is not limited thereto, and any material can be used as long as it exhibits translucency and conductivity.

Figure 2:
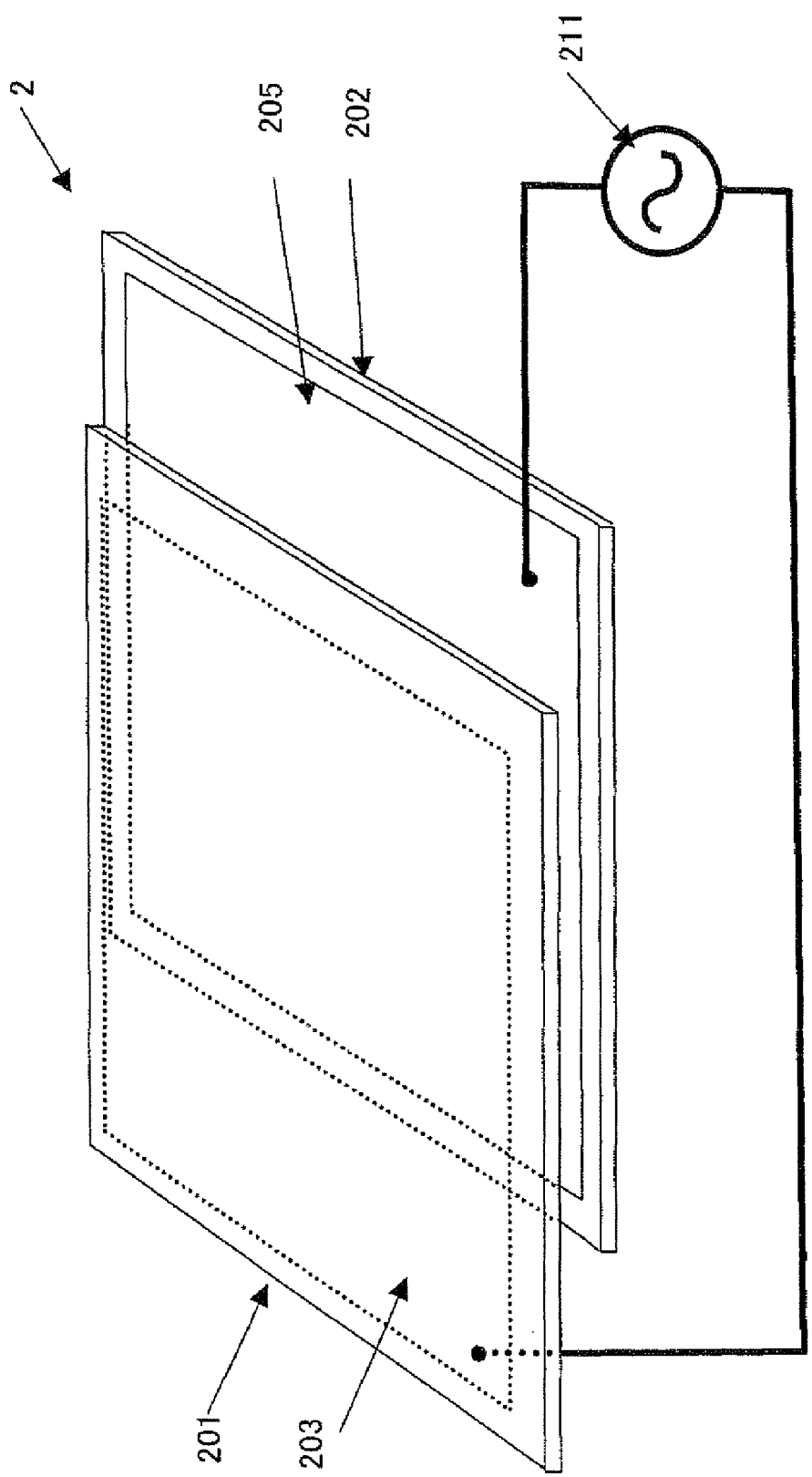
FIG. 2 is a schematic view showing a connection state between translucent electrode films and a driving circuit of a viewing angle control liquid crystal panel according to an embodiment of the present invention.

Further, as shown in FIG. 2, the viewing angle control liquid crystal panel 2 includes a driving circuit 211 so as to apply a voltage to the translucent electrode films 203 and 205 for driving the liquid crystal. As described below, the driving circuit 211 controls ON/OFF of the voltage between the translucent electrode films 203 and 205, thereby switching a display state of the display liquid crystal panel 1 between a state allowing an observer to view the panel from a wide viewing angle (i.e., a wide viewing angle state) and a state not allowing the observer to view the panel from an oblique direction at a predetermined angle or more from a normal direction to a horizontal direction of the panel (i.e., a narrow viewing angle state). For ease of explanation, FIG. 2 shows only the translucent substrates 201 and 202, the translucent electrode films 203 and 205, and the driving circuit 211 among the constituent members of the viewing angle control liquid crystal panel 2. FIG. 2 shows the exemplary configuration in which the translucent substrates 201 and 202 are adhered to each other while being shifted from each other, so that wirings from the driving circuit 211 are connected to respective positions on the translucent electrode films 203 and 205 that are not opposed to each other. In FIG. 2, the amount of the shift between the translucent substrates 201 and 202 is exaggerated. Further, the method of connecting the translucent electrode films 203 and 205 and the driving circuit 211 is not limited to the exemplary configuration shown in FIG. 2.

On the translucent electrode film 205, translucent dielectric films 206g and 206r functioning as means for adjusting VT (voltage-transmittance) characteristics are formed at positions corresponding to a green picture element and a red picture element, respectively, in the display liquid crystal panel 1. The translucent dielectric film 206g is formed by patterning a thin film that is formed by sputtering by photolithography at the position corresponding to the green picture element in the display liquid crystal panel 1. Similarly, the translucent dielectric film 206r is formed by patterning a thin film that is formed to have a thickness different from that of the translucent dielectric film 206g by sputtering by photolithography at the position corresponding to the red picture element in the display liquid crystal panel 1. Since the green color filters 103g are arranged in a stripe shape in the display liquid crystal panel 1, the translucent dielectric film 206g may be patterned into a stripe shape corresponding to that of the green color filters 103g. However, the translucent dielectric film 206g also may be patterned into a shape corresponding to the pixel electrode for each green picture element. The same applies to the translucent dielectric film 206r corresponding to the red picture element.

On the translucent dielectric films 206g and 206r, a flattening film 207 is formed so as to eliminate steps between a surface of the translucent electrode film 205 and surfaces of the translucent dielectric films 206g and 206r. The flattening film 207 is formed by, for example, applying a transparent acrylic resin by spin coating. On the flattening film 207, an alignment film 208 is formed. The alignment films 204 and 208 are made of polyimide, for example, and are subjected to a so-called anti-parallel rubbing treatment in directions parallel and opposite to each other.

With this configuration, the liquid crystal injected between the alignment films 204 and 208 is arranged such that its long molecular axis is substantially parallel to the rubbing directions, which is so-called homogeneous alignment. When the driving circuit 211 applies a predetermined voltage between the translucent electrode films 203 and 205, liquid crystal molecules rise with their long molecular axes forming a predetermined angle with respect to a normal direction of the substrates. A pair of linear polarizers 209 and 210 are arranged on outer sides of the translucent substrates 201 and 202, respectively, so that their transmission axes are substantially parallel to the rubbing directions of the alignment films 204 and 208.

Thus, when no voltage is applied between the translucent electrode films 203 and 205, linearly polarized light that has passed through the display liquid crystal panel 1 and then through the linear polarizers 108 and 210 is incident on the liquid crystal layer of the viewing angle control liquid crystal panel 2. Then, the light passes through the liquid crystal layer without being affected by birefringence of the liquid crystal molecules, and then passes through the linear polarizer 209 to reach the observer even when the panel is viewed from any viewing angle in the normal direction of the substrates and the oblique direction. Accordingly, when no voltage is applied between the translucent electrode films 203 and 205, the display liquid crystal panel 1 assumes the display state allowing the observer to view the panel from a wide viewing angle (i.e., the wide viewing angle state).

On the other hand, when a voltage is applied between the translucent electrode films 203 and 205, due to the liquid crystal molecules arranged at an angle with respect to the normal direction of the substrates as described above, light passing through the liquid crystal layer of the viewing angle control liquid crystal panel 2 in the oblique direction is affected by birefringence of the liquid crystal molecules, so that a phase difference occurs, which makes it impossible for the light to pass through the linear polarizer 209. Accordingly, when a voltage is applied between the translucent electrode films 203 and 205, the display liquid crystal panel 1 assumes the display state not allowing the observer to view the panel from an oblique direction at a predetermined angle or more from the normal direction to the horizontal direction of the panel (i.e., the narrow viewing angle state).

As described above, the driving circuit 211 switches the voltage between the translucent electrode films 203 and 205 of the viewing angle control liquid crystal panel 2, thereby switching between the wide viewing angle state and the narrow viewing angle state. In FIG. 1, the two linear polarizers (i.e., the linear polarizers 108 and 210) are provided between the liquid crystal layer of the display liquid crystal panel 1 and the liquid crystal layer of the viewing angle control liquid crystal panel 2. However, one of the linear polarizers 108 and 210 can be omitted if they have substantially the same transmittance axis angle.

As described above, the film thickness of the translucent dielectric film 206g is different from that of the translucent dielectric film 206r. These film thicknesses are determined as follows, for example. It is assumed that blue light has a wavelength of 450 nm, green light has a wavelength of 550 nm, and red light has a wavelength of 650 nm.

First, a viewing angle control liquid crystal panel having the same structure as that of the viewing angle control liquid crystal panel 2 according to the present embodiment except that the translucent dielectric films 206g and 206r are not provided is prototyped (hereinafter, referred to as a "prototype panel"). Then, the prototype panel is used to measure VT characteristics for each wavelength component of red, green, and blue from a viewing angle (for example, an oblique direction at an angle of 50° from a normal direction to a horizontal direction of the panel) at which the display state is to be switched between display and non-display by the viewing angle control liquid crystal panel 2.

Then, a voltage that leads to minimum transmittance (hereinafter, referred to as a "minimum transmittance voltage") is obtained for each of red, green, and blue. The minimum transmittance voltage for the red wavelength component is Vmin(r), the minimum transmittance voltage for the green wavelength component is Vmin(g), and the minimum transmittance voltage for the blue wavelength component is Vmin(b). The highest voltage value among Vmin(r), Vmin(g), and Vmin(b) is set as a reference voltage VST.

Then, a film thickness dg of the translucent dielectric film 206g corresponding to the green picture element is calculated based on Formula (1) below. In Formula (1), $\in s$ is a dielectric constant of a material of the translucent dielectric film 206g. Further, $\in LC$ is a dielectric constant of the liquid crystal used in the viewing angle control liquid crystal panel 2. The dielectric constant $\in LC$ during application of the reference voltage VST is obtained based on V-$\in$ characteristics of the liquid crystal that was measured in advance. Further, dLC is a thickness of the liquid crystal layer of the viewing angle control liquid crystal panel 2 in the normal direction of the substrates.

$$V\min(g)/VST = Cs/(CLC+Cs) = (\in s/dg)/(\in LC/dLC + \in s/dg) \quad (1)$$

Based on Formula (1) above, dg is expressed by Formula (2) below $$dg = \in s \times dLC(VST - V\min(g))/(V\min(g) \times \in LC) \quad (2)$$

Similarly, a film thickness dr of the translucent dielectric film 206r corresponding to the red picture element can be calculated based on Formula (3) below.

$$dr = \in s \times dLC(VST - V\min(r))/(V\min(r) \times \in LC) \quad (3)$$

Figure 4:
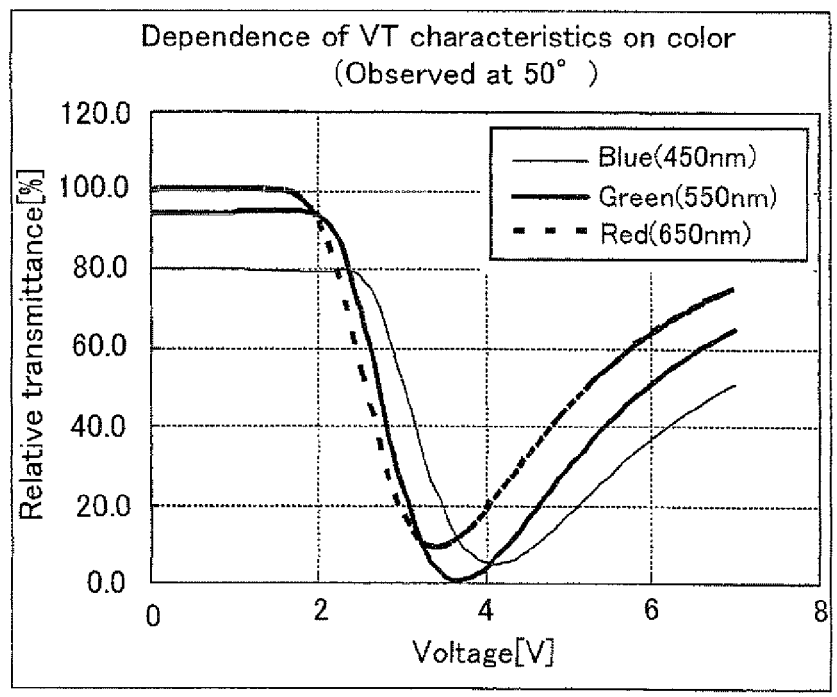
FIG. 4 is a graph showing VT characteristics of a prototype panel according to a comparative example of the present invention, which is observed at a predetermined angle from a normal direction to a horizontal direction of the panel.

The viewing angle control liquid crystal panel 2 according to the present embodiment is configured schematically as described above. Next, a specific example of the viewing angle control liquid crystal panel 2 will be described. First, a specific example of the film thicknesses dg and dr of the translucent dielectric films 206g and 206r will be described. It is assumed that the VT characteristics for each wavelength component of red, green, and blue measured with the prototype panel are as shown in FIG. 4. FIG. 4 shows the VT characteristics obtained when the prototype panel is observed at a predetermined angle (50°) from the normal direction to the horizontal direction of the panel. In FIG. 4, "relative transmittance" is a value obtained relative to the transmittance of the red (650 nm) wavelength component when no voltage is applied to the prototype panel, which is taken as 100.

In the example shown in FIG. 4, the minimum transmittance voltage Vmin(b) for blue was the highest at about 4.0 V, followed by the minimum transmittance voltage Vmin(g) for green at about 3.7 V, and the minimum transmittance voltage Vmin(r) for red at about 3.4 V. Namely, in the example shown in FIG. 4, the reference voltage VST was about 4.0 V. A liquid crystal material (ZLI4792 (trade name) manufactured by Merck Ltd.) used in the prototype panel had a dielectric constant $\in LC$ of 6.3 when the above-described reference voltage VST was applied. The translucent dielectric films 206g and 206r were made of silicon dioxide ($SiO_2$, dielectric constant $\in s=4.0$). The cell thickness dLC of the liquid crystal was 6.9 µm. It was found as a result of substituting the respective values into Formulae (2) and (3) that the film thickness dg of the translucent dielectric film 206g corresponding to the green picture element was preferably 350 nm, and the film thickness dr of the translucent dielectric film 206r corresponding to the red picture element was preferably 600 nm.

Although in the above-described specific example, the translucent dielectric films 206g and 206r were made of silicon dioxide having a relative dielectric constant of 4.0, the material is not limited thereto. For example, an inorganic dielectric film of silicon nitride ($Si_2N_3$, relative dielectric constant: 3.9), tantlum pentoxide ($Ta_2O_5$, relative dielectric constant: 25), or the like and an organic dielectric film of polyimide (relative dielectric constant 3.0 to 3.6) or the like are available. When such a film is used, the film thicknesses dg and dr of the translucent dielectric films 206g and 206r may be set appropriately in accordance with the relative dielectric constant of the film material based on Formula (2) and (3) above, thereby achieving the effect of the present invention.

The translucent dielectric films 206g and 206r can be formed by various methods such as CVD (chemical vapor deposition), electron beam (EB) deposition, and spin coating, in addition to sputtering. In the present embodiment, the translucent dielectric films 206g and 206r were formed only on a translucent substrate 202 side. However, the present invention is not limited thereto, and they may be formed only on a translucent substrate 201 side. Alternatively, the translucent dielectric films 206g and 206r may be formed on both the translucent substrate 201 side and the translucent substrate 202 side. In this case, the sums of the film thicknesses of the translucent dielectric films 206g and 206r formed on the translucent substrates 201 and 202 may be made equal to the film thicknesses dg and dr obtained by Formulae (2) and (3) above.

In the present example, the alignment films 204 and 208 were formed of a polyimide film, SE7492 (trade name), manufactured by NISSAN CHEMICAL INDUSTRIES, LTD. The alignment films were printed on the transparent electrode films by offset printing.

After the printing, the alignment films 204 and 208 were pre-baked with a hot plate at 70° C. for 5 minutes, followed by post-baking at 200° C. for 60 minutes. The alignment films 204 and 208 are not limited to a polyimide film, and an organic film of PVA (polyvinyl alcohol) or the like and an inorganic film of SiO or the like are also available. In the present example, the alignment films 204 and 208 were subjected to an alignment treatment by rubbing. As a rubbing cloth, a rayon cloth, YA-18R (trade name), manufactured by YOSHIKAWA CHEMICAL CO., LTD., was used. The rubbing was performed three times with a rubbing device having a roller with a diameter of 130 mm under the conditions that the pile contact length was 0.5 mm, the stage speed was 100 mm/s, and the revolutions per minute of the roller was 300 rpm. The rubbing was performed in directions parallel to the stripe of the color filters 103 and parallel and opposite to each other between the alignment films 204 and 208, which is so-called anti-parallel rubbing.

After the rubbing, a spacer was formed on the translucent substrate 202 side so as to make the cell thickness uniform. In the present example, 150 to 200 plastic beads, SP-2069 (trade name, diameter: 6.9 μm), manufactured by SEKISUI CHEMICAL CO., LTD, were dry-sprayed per square millimeter. On the translucent substrate 201 side, a thermosetting sealing resin (not shown) was applied to the periphery of the translucent electrode film 203 by screen printing. In the present example, the thermosetting sealing resin was XN21 (trade name) manufactured by Mitsui Chemicals Inc. After the application of the sealing, the translucent substrate 201 was pre-baked with a hot plate at 90° C. for 10 minutes, and pressed at a low pressure and subjected to alignment while being opposed to the translucent substrate 202 on which the spacer was sprayed. Then, the resultant translucent substrates 201, 202 were pressed fully with a pressing jig at a high pressure, and fired fully in an oven at 200° C. for 2 hours with the jig pressure maintained. After the full firing, a liquid crystal material was injected into a cell gap by a vacuum injection method, followed by sealing of an injection port with an ultraviolet curable resin. In the present example, the liquid crystal material was ZLI4792 (trade name) manufactured by Merck Ltd.

The linear polarizers 209 and 210 were adhered to the outer sides of the translucent substrates 201 and 202, respectively, so that their transmission axes were substantially parallel to the rubbing directions of the alignment films 204 and 208. In this manner, the viewing angle control liquid crystal panel according to an example of the present invention was obtained. The above-described constituent materials and manufacturing conditions of the viewing angle control liquid crystal panel are merely examples, and the present invention is not limited thereto.

Figures 5, 6:
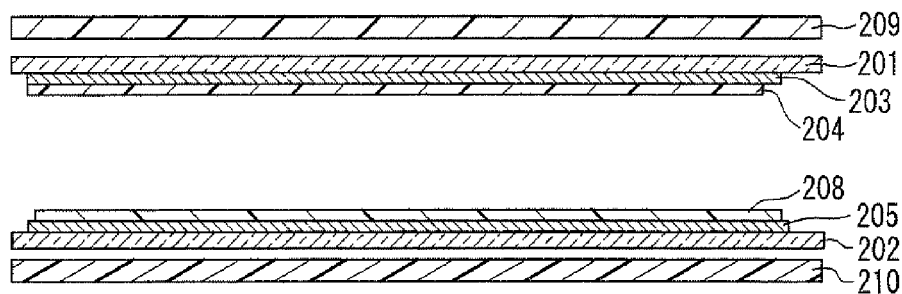
FIG. 5 is a cross-sectional view showing a schematic configuration of the prototype panel according to the comparative example of the present invention.
FIG. 6 is an explanatory diagram showing the transmittance of each color component when a voltage of 3.7 V is applied to the viewing angle control liquid crystal panel according to the comparative example, and the transmittance of each color component when a voltage of 4.0 V is applied to a viewing angle control liquid crystal panel according an example of the present invention.

FIG. 5 is a cross-sectional view of a viewing angle control liquid crystal panel according to a comparative example of the present invention. This viewing angle control liquid crystal panel corresponds to the prototype panel exhibiting the VT characteristics shown in FIG. 4 above, and has totally the same structure as that of the viewing angle control liquid crystal panel 2 according to the present embodiment except that the translucent dielectric films 206g and 206r are not provided. In FIG. 5, the same constituent members as those of the viewing angle control liquid crystal panel 2 shown in FIG. 1 are denoted with the same reference numerals. Also in this prototype panel, a liquid crystal material is ZLI4792 (trade name) manufactured by Merck Ltd., and has a cell thickness of 6.9 μm as described above.

Figure 3:
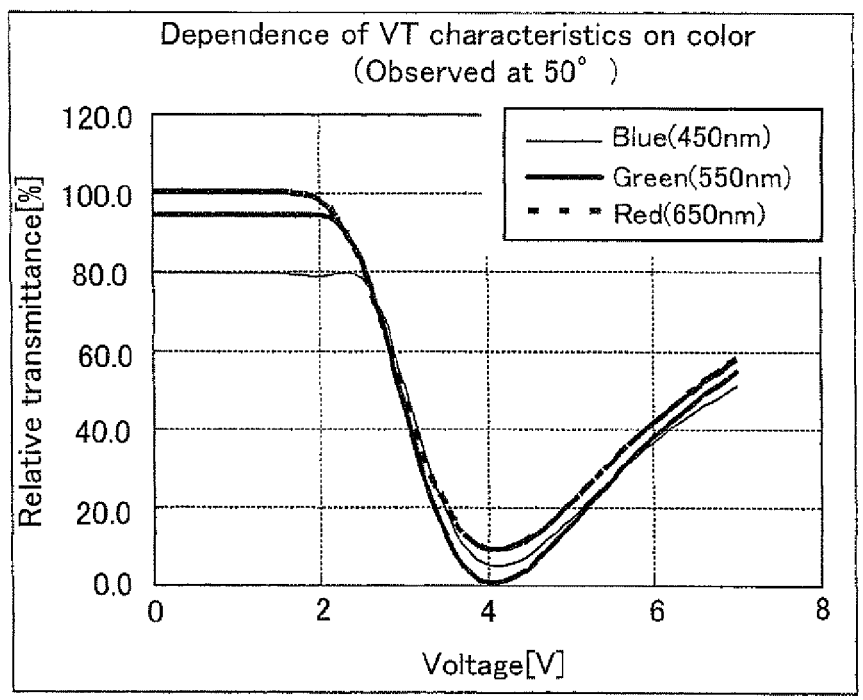
FIG. 3 is a graph showing VT characteristics of the viewing angle control liquid crystal panel according to an embodiment of the present invention.

FIG. 3 is a graph showing VT characteristics of the viewing angle control liquid crystal panel 2 according to the above-described example of the present invention when the panel is viewed from an oblique direction (at an angle of 50° from the normal direction to the horizontal direction of the panel). In FIG. 3, "relative transmittance" is a value obtained relative to the transmittance of the red (650 nm) wavelength component when no voltage is applied to the viewing angle control liquid crystal panel 2 according to the present example, which is taken as 100. FIG. 6 shows the transmittance of each color component when a voltage of 3.7 V is applied to the viewing angle control liquid crystal panel according to the comparative example, and the transmittance of each color component when a voltage of 4.0 V is applied to the viewing angle control liquid crystal panel 2 according to the present example. In FIG. 6, a voltage of 3.7 V is applied to the viewing angle control liquid crystal panel according to the comparative example, because in order to suppress the transmittance of green light that is most visible to the human eye, the voltage value that makes the transmittance of the green component lowest (see FIG. 4) should be selected.

As can be seen from FIG. 4, the voltage value that leads to minimum transmittance varies among the respective wavelength components in the viewing angle control liquid crystal panel of the comparative example. Accordingly, when a voltage of 3.7 V is applied to the viewing angle control liquid crystal panel according to the comparative example so as to provide the narrow viewing angle state, a display on the display liquid crystal panel 1 is viewed in a slightly bluish state because the transmittance of the blue component is relatively high with respect to this voltage (see FIG. 6). On the other hand, as can be seen from FIG. 3, the voltage value that leads to minimum transmittance is 4.0 V among the respective color components in the viewing angle control liquid crystal panel 2 according to the present example. Accordingly, when a voltage of 4.0 V is applied to the viewing angle control liquid crystal panel 2 according to the present example, an almost completely uniform black display is caused when the panel is viewed from an oblique direction at an angle of 50° or more from the normal direction to the horizontal direction of the panel, preventing a display on the display liquid crystal panel 1 from being viewed.

As described above, according to the present embodiment, by including the viewing angle control liquid crystal panel 2, the liquid crystal display can cause an almost completely uniform black display and achieve a significantly improved shielding ability during the narrow viewing angle state.

The above-described specific example is only an embodiment of the present invention, and various modifications are possible within the scope of the invention. For example, although the liquid crystal is aligned homogeneously in the viewing angle control liquid crystal panel in the above-described embodiment, the alignment of the liquid crystal of the viewing angle control device according to the present invention is not limited to the homogeneous alignment. In other words, any liquid crystal mode can be applied to the present invention as long as it enables switching between the wide viewing angle state and the narrow viewing angle state by using birefringence of the liquid crystal.

Further, in the above-described embodiment, each pixel in the display liquid crystal panel 1 is composed of picture elements of three primary colors of red, blue, and green. However, the present invention also includes an embodiment in which each pixel in the display liquid crystal panel 1 is composed of four or more picture elements including an additional picture element of a color other than three primary colors. In this case, the viewing angle control liquid crystal panel 2 also includes a translucent dielectric film at a position corresponding to the additional picture element of the color other than three primary colors in accordance with the color of the picture element. Hereinafter, some specific examples in which one pixel is composed of four or more picture elements will be described.

Figure 7:
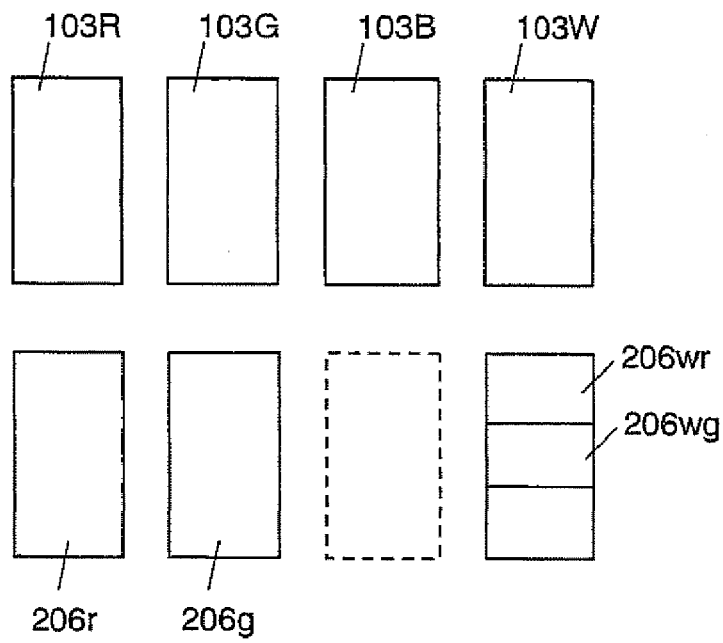
FIG. 7 is a schematic view showing a positional relationship between picture elements in a display liquid crystal panel and translucent dielectric films in a viewing angle control device in a display according to a variation of the present invention.

For example, in the display liquid crystal panel 1, each pixel may be composed of a total of four picture elements of three primary colors of red (R), blue (B), and green (G) as well as white (W). In this case, as shown in FIG. 7, in the display liquid crystal panel 1, the color filters 103 including a red color filter 103R, a green color filter 103G, a blue color filter 103B, and a white color filter 103W are arranged in a stripe shape. However, the order of arrangement of the respective color filters and their relative positional relationship are not limited to those shown in this figure. In this case, as shown in the figure, in the viewing angle control liquid crystal panel 2, the translucent dielectric films 206g and 206r are formed respectively at positions corresponding to the green picture element (green color filter 103G) and the red picture element (red color filter 103R) in the display liquid crystal panel 1 on the translucent electrode film 205. Further, a portion corresponding to the white picture element (white color filter 103W) on the same translucent electrode film 205 is divided into three regions almost equally. A translucent dielectric film 206wg having the same film thickness as the translucent dielectric film 206g is formed in one of the regions, and a translucent dielectric film 206wr having the same film thickness as the translucent dielectric film 206r is formed in another region. In the example shown in FIG. 7, the translucent dielectric films 206wg and 206wr are formed adjacent to each other. However, the arrangement of the translucent dielectric films 206wg and 206wr in the portion corresponding to the white picture element is arbitrary. The translucent dielectric film 206g and the translucent dielectric film 206wg can be made of the same material at the same time. Similarly, the translucent dielectric film 206r and the translucent dielectric film 206wr also can be made of the same material at the same time.

As described above, since the translucent dielectric film 206wg and the translucent dielectric film 206wr are provided in the portion corresponding to the white picture element (white color filter 103W), when the viewing angle control liquid crystal panel 2 assumes the narrow viewing angle state, it is possible to suppress coloring of light that passes through the portion corresponding to the white picture element, resulting in a pure black display.

Figure 8:
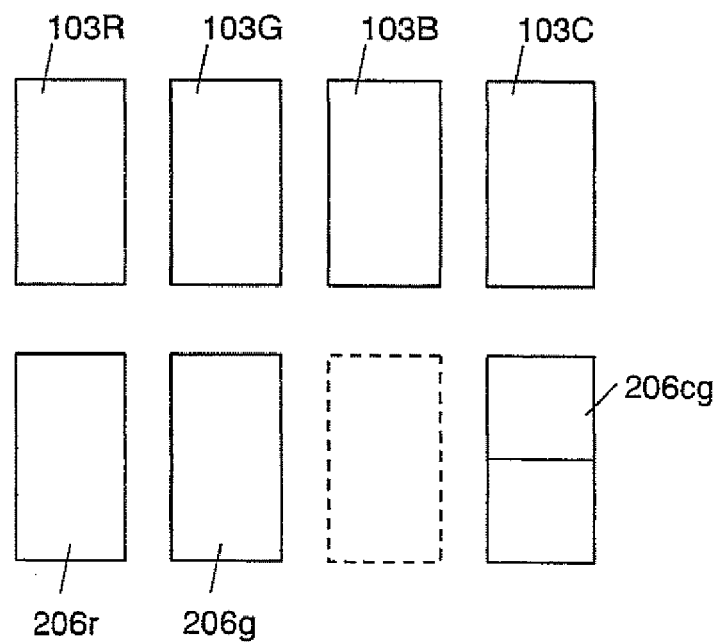
FIG. 8 is a schematic view showing a positional relationship between picture elements in a display liquid crystal panel and translucent dielectric films in a viewing angle control device in a display according to a variation of the present invention.

Alternatively as shown in FIG. 8, in the display liquid crystal panel 1, each pixel may be composed of a total of four picture elements of three primary colors of red (R), blue (B), and green (G) as well as cyan (C). In this case, as shown in FIG. 8, in the display liquid crystal panel 1, the color filters 103 including a red color filter 103R, a green color filter 103G, a blue color filter 103B, and a cyan color filter 103C are arranged in a stripe shape. However, the order of arrangement of the respective color filters and their relative positional relationship are not limited to those shown in this figure. In this case, as shown in the figure, in the viewing angle control liquid crystal panel 2, the translucent dielectric films 206g and 206r are formed respectively at positions corresponding to the green picture element (green color filter 103G) and the red picture element (red color filter 103R) in the display liquid crystal panel 1 on the translucent electrode film 205. Further, a portion corresponding to the cyan picture element (cyan color filter 103C) on the same translucent electrode film 205 is divided into two regions almost equally. A translucent dielectric film 206cg having the same film thickness as the translucent dielectric film 206g is formed in one of the regions. Cyan is a color (complementary red) obtained by mixing green and blue. Since the translucent dielectric film 206cg having the same film thickness as that provided at the position corresponding to the green picture element is provided in the portion corresponding to the cyan picture element, when the viewing angle control liquid crystal panel 2 assumes the narrow viewing angle state, it is possible to suppress coloring of light that passes through the portion corresponding to the cyan picture element, resulting in a pure black display.

Figure 9:
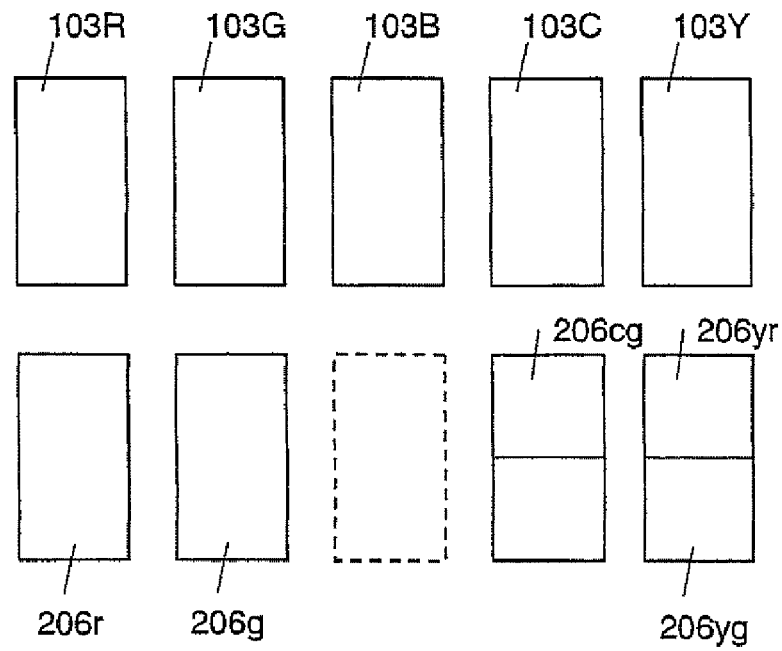
FIG. 9 is a schematic view showing a positional relationship between picture elements in a display liquid crystal panel and translucent dielectric films in a viewing angle control device in a display according to a variation of the present invention.

Alternatively as shown in FIG. 9, in the display liquid crystal panel 1, each pixel may be composed of a total of five picture elements of three primary colors of red (R), blue (B), and green (G) as well as cyan (C) and yellow (Y). In this case, as shown in FIG. 9, in the display liquid crystal panel 1, the color filters 103 including a red color filter 103R, a green color filter 103G, a blue color filter 103B, a cyan color filter 103C, and a yellow filter 103Y are arranged in a stripe shape. However, the order of arrangement of the respective color filters and their relative positional relationship are not limited to those shown in this figure. In this case, as shown in the figure, in the viewing angle control liquid crystal panel 2, the translucent dielectric films 206g and 206r are formed respectively at positions corresponding to the green picture element (green color filter 103G) and the red picture element (red color filter 103R) in the display liquid crystal panel 1 on the translucent electrode film 205. Further, a portion corresponding to the cyan picture element (cyan color filter 103C) on the same translucent electrode film 205 is divided into two regions almost equally. A translucent dielectric film 206cg having the same film thickness as the translucent dielectric film 206g is formed in one of the regions. Further, a portion corresponding to the yellow picture element (yellow color filter 103Y) is divided into two regions almost equally. A translucent dielectric film 206yg having the same film thickness as the translucent dielectric film 206g is formed in one of the regions, and a translucent dielectric film 206yr having the same film thickness as the translucent dielectric film 206r is formed in the other region. Yellow is a color (complementary blue) obtained by mixing green and red. Since the translucent dielectric films 206yg and 206yr having the same film thicknesses as those provided at the positions corresponding to the green and red picture elements are provided in the portion corresponding to the yellow picture element, when the viewing angle control liquid crystal panel 2 assumes the narrow viewing angle state, it is possible to suppress coloring of light that passes through the portion corresponding to the yellow picture element, resulting in a pure black display.

Figure 10:
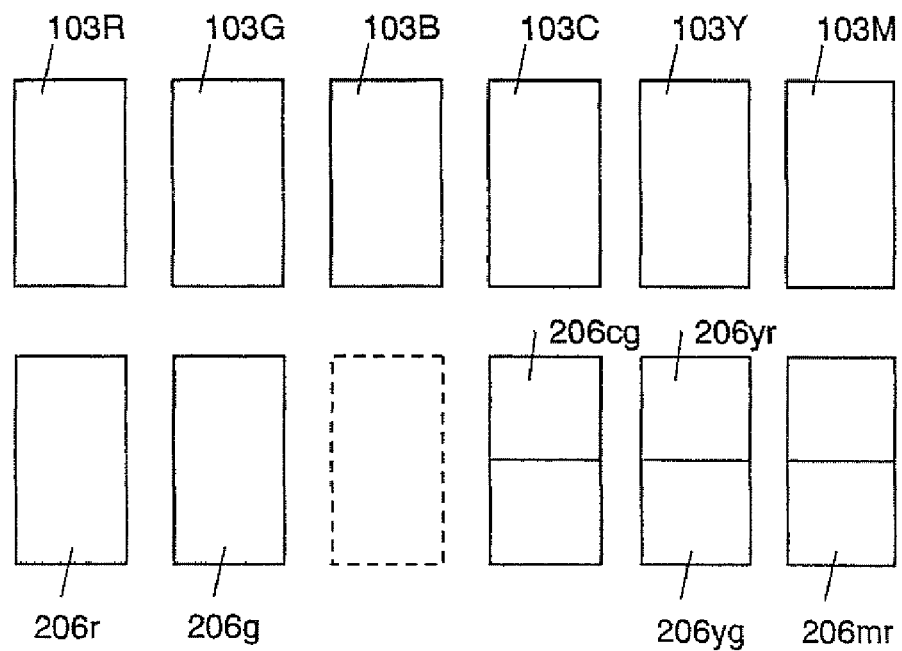
FIG. 10 is a schematic view showing a positional relationship between picture elements in a display liquid crystal panel and translucent dielectric films in a viewing angle control device in a display according to a variation of the present invention.
Figure 11B:
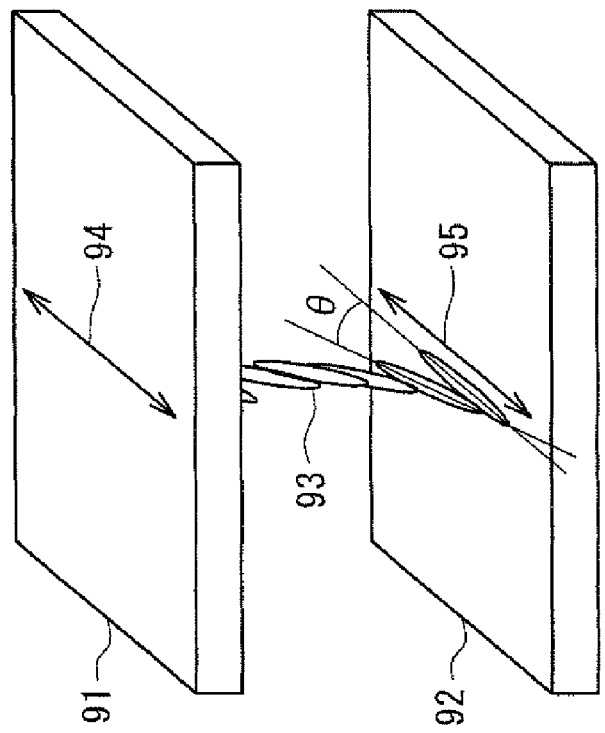
FIGS. 11A and 11B are schematic views showing states of liquid crystal molecules during a wide viewing angle state and a narrow viewing angle state, respectively, in a conventional viewing angle control device.
Figure 11A:
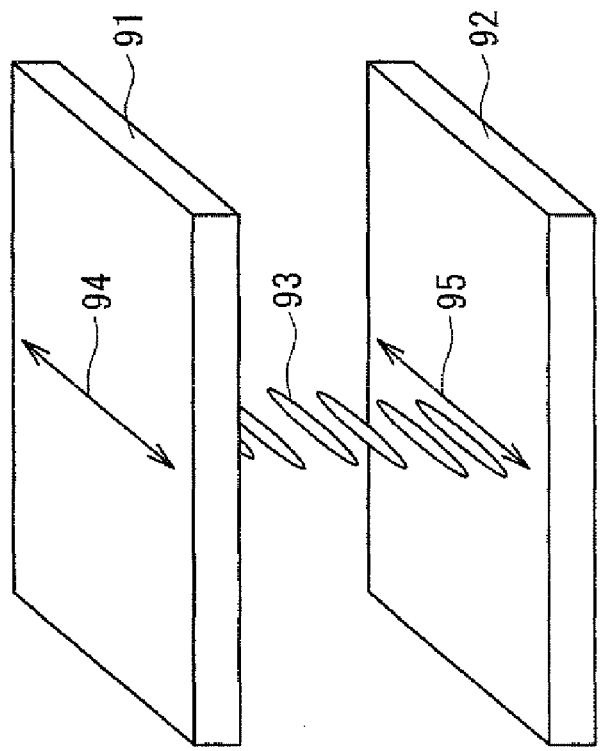
Figure 12:
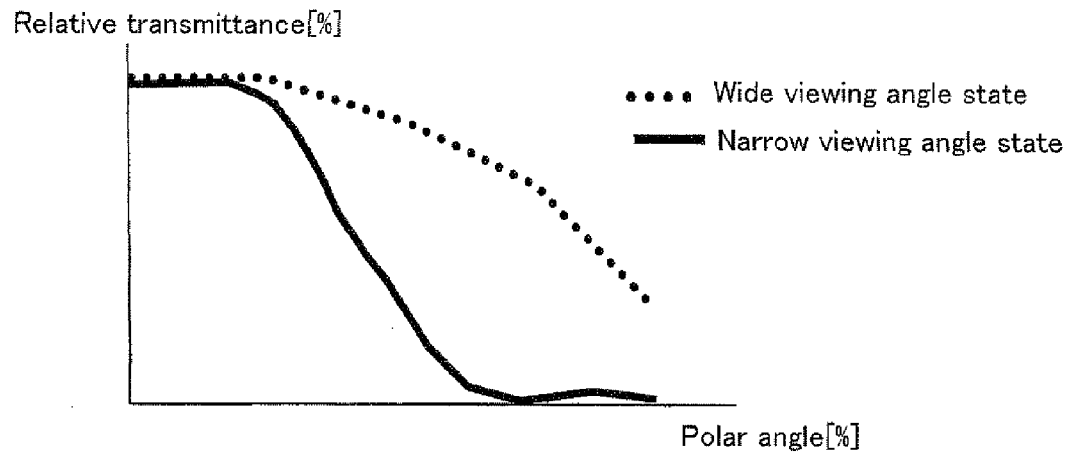
FIG. 12 is a graph showing the dependence of transmittance on polar angle during the wide and narrow viewing states in the conventional viewing angle control device.
Figure 13:
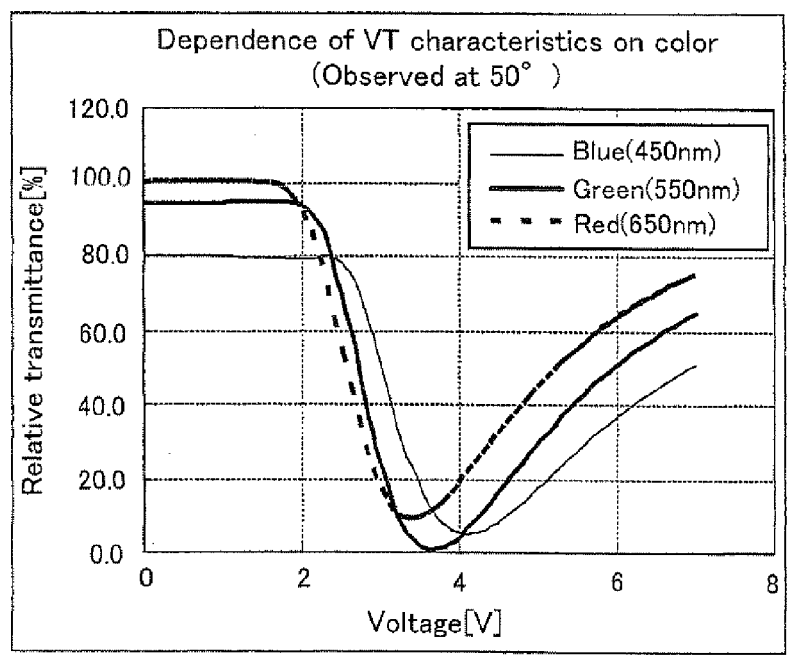
FIG. 13 is a graph showing VT characteristics of each color component when the conventional viewing angle control device is viewed from an oblique direction.

Alternatively, as shown in FIG. 10, in the display liquid crystal panel 1, each pixel may be composed of a total of six picture elements of three primary colors of red (R), blue (B), and green (G) as well as cyan (C), yellow (Y), and magenta (M). In this case, as shown in FIG. 10, in the display liquid crystal panel 1, the color filters 103 including a red color filter 103R, a green color filter 103G, a blue color filter 103B, a cyan color filter 103C, a yellow color filter 103Y, and a magenta color filter 103M are arranged in a stripe shape. However, the order of arrangement of the respective color filters and their relative positional relationship are not limited to those shown in this figure. In this case, as shown in the figure, in the viewing angle control liquid crystal panel 2, the translucent dielectric films 206g and 206r are formed respectively at positions corresponding to the green picture element (green color filter 103G) and the red picture element (red color filter 103R) in the display liquid crystal panel 1 on the translucent electrode film 205. Further, a portion corresponding to the cyan picture element (cyan color filter 103C) on the same translucent electrode film 205 is divided into two regions almost equally. A translucent dielectric in 206cg having the same film thickness as the translucent dielectric film 206g is formed in one of the regions. Further, a portion corresponding to the yellow picture element (yellow color filter 103Y) is divided into two regions almost equally. A translucent dielectric film 206yg having the same film thickness as the translucent dielectric film 206g is formed in one of the regions, and a translucent dielectric film 206yr having the same film thickness as the translucent dielectric film 206r is formed in the other region. Further, a portion corresponding to the magenta picture element (magenta color filter 103M) is divided into two regions almost equally. A translucent dielectric film 206mr having the same film thickness as the translucent dielectric film 206r is formed in one of the regions. Magenta is a color (complementary green) obtained by mixing blue and red. Since the translucent dielectric film 206mr having the same film thickness as that provided at the position corresponding to the red picture element is provided in the portion corresponding to the magenta picture element, when the viewing angle control liquid crystal panel 2 assumes the narrow viewing angle state, it is possible to suppress coloring of light that passes through the portion corresponding to the magenta picture element, resulting in a pure black display.

INDUSTRIAL APPLICABILITY

The present invention, which provides a viewing angle control device that can provide a black display without coloring and achieve a significantly improved shielding ability during a narrow viewing angle state, and a display using the same, has industrial applicability.

The invention claimed is:

1. A display comprising: a display device including picture elements of a plurality of colors, each being driven in accordance with an image to be displayed; and a viewing angle control device that is arranged on at least one of a backside and a front side of the display device and controls a viewing angle of the display device,
   wherein the viewing angle control device includes: a pair of substrates, each including at least an electrode and an alignment film; liquid crystal sandwiched between the pair of substrates; a driving circuit that applies a voltage to the electrode provided on each of the pair of substrates; and a pair of polarizers provided so as to sandwich the pair of substrates therebetween,
   the driving circuit switches the voltage to be applied to the electrode, thereby switching a range of the viewing angle in which a display on the display device can be viewed, between a first state providing a first viewing angle range and a second state providing a second viewing angle range that is within the first viewing angle range and narrower than the first viewing angle range, and
   the viewing angle control device includes a dielectric film at a position corresponding to the picture element of at least one of the colors in the display device on at least one of the pair of substrates, the dielectric film adjusting voltage-transmittance characteristics of the liquid crystal of the viewing angle control device.

2. The display according to claim 1,
   wherein the picture elements of the plurality of colors include picture elements of three colors that blend to make white, and
   the viewing angle control device includes the dielectric films at positions corresponding to the picture elements of two of the three colors in the display device on at least one of the pair of substrates, the dielectric films having thicknesses that vary depending on the color.

3. The display according to claim 2,
   wherein the picture elements of the plurality of colors further include a picture element of white, and
   the viewing angle control device includes the dielectric films in a portion corresponding to the white picture element in the display device on at least one of the pair of substrates, the dielectric films having the same thicknesses as those provided at the positions corresponding to the picture elements of two of the three colors in the display device.

4. The display according to claim 2,
   wherein the picture elements of the three colors are picture elements of red, green, and blue, and
   the dielectric films are provided at positions corresponding to the red and green picture elements in the display device on at least one of the pair of the substrates.

5. The display according to claim 4,
   wherein the picture elements of the plurality of colors further include a picture element of a complementary color of at least one of the three colors, and
   the viewing angle control device includes the dielectric film in a portion corresponding to the picture element of the complementary color in the display device on at least one of the pair of substrates, the dielectric film having the same thickness as that provided at the position corresponding to at least one of the picture elements of two of the three colors that make the complementary color in the display device.

6. The display according to claim 5,
   wherein the picture element of the complementary color includes a picture element of cyan, and
   the viewing angle control device includes the dielectric film in a portion corresponding to the cyan picture element in the display device on at least one of the pair of substrates, the dielectric film having the same thickness as that provided at the position corresponding to the green picture element in the display device.

7. The display according to claim 6,
   wherein the picture elements of the plurality of colors further include a picture element of yellow, and
   the viewing angle control device includes the dielectric films in a portion corresponding to the yellow picture element in the display device on at least one of the pair of substrates, the dielectric films having the same thicknesses as those provided at the positions corresponding to the red and green picture elements in the display device.

8. The display according to claim 6,
   wherein the picture elements of the plurality of colors further include a picture element of magenta, and
   the viewing angle control device includes the dielectric film in a portion corresponding to the magenta picture element in the display device on at least one of the pair of substrates, the dielectric film having the same thickness as that provided at the position corresponding to the red picture element in the display device.

9. The display according to claim 2, wherein the dielectric film has a film thickness d expressed by the following formula:

$$d = \in_s \times dLC(VST - V\min)/(V\min \times \in LC),$$

where VST is the highest voltage value among applied voltages that respectively lead to minimum transmittance for wavelength components of the three colors when the dielectric film is not provided, Vmin is an applied voltage that leads to minimum transmittance for a wavelength component of the color of the picture element to which the dielectric film corresponds, $\in_s$ is a dielectric constant of the dielectric film, $\in_{LC}$ is a dielectric constant of the liquid crystal when the voltage VST is applied, and dLC is a thickness of the liquid crystal layer.

10. The display according to claim 1,
wherein the liquid crystal layer of the viewing angle control device includes positive-type nematic liquid crystal,
the polarizers are arranged so that their polarization-transmission axes are substantially parallel to rubbing directions of the alignment films, and
the driving circuit provides the first viewing angle range by applying no voltage to the liquid crystal layer, and provides the second viewing angle range by applying a predetermined voltage to the liquid crystal layer.

11. The display according to claim 1, wherein the alignment films provided respectively on the pair of substrates of the viewing angle control device are subjected to a rubbing treatment in directions parallel and opposite to each other.

12. A viewing angle control device that is arranged on at least one of a backside and a front side of a display device, and controls a viewing angle of the display device, the display device including picture elements of a plurality of colors, each being driven in accordance with an image to be displayed,
the viewing angle control device comprising:
a pair of substrates, each including at least an electrode and an alignment film;
liquid crystal sandwiched between the pair of substrates;
a driving circuit that applies a voltage to the electrode provided on each of the pair of substrates; and
a pair of polarizers provided so as to sandwich the pair of substrates therebetween,
wherein the driving circuit switches the voltage to be applied to the electrode, thereby switching a range of the viewing angle in which a display on the display device can be viewed, between a first state providing a first viewing angle range and a second state providing a second viewing angle range that is within the first viewing angle range and narrower than the first viewing angle range, and
the viewing angle control device includes a dielectric film at a position corresponding to the picture element of at least one of the colors in the display device on at least one of the pair of substrates, the dielectric film adjusting voltage-transmittance characteristics of the liquid crystal.

* * * * *